Dec. 20, 1927.

M. CAPRA 1,653,000

DRAIN BOARD

Filed April 6, 1926

INVENTOR.
MARY CAPRA.
BY
ATTORNEYS.

Patented Dec. 20, 1927.

1,653,000

UNITED STATES PATENT OFFICE.

MARY CAPRA, OF ALAMEDA, CALIFORNIA.

DRAIN BOARD.

Application filed April 6, 1926. Serial No. 100,006.

The present invention relates to improvements in sink strainers and has for its particular object to provide a drain board adapted to be placed in the sink and dimensioned to be substantially co-extensive with the bottom of the sink. A further object of the invention is to combine with a drain board of this character strainers adapted to prevent splashing of water discharged from faucets normally used in connection with sinks. A further object of the invention is to provide a strainer in connection with this drain board that will collect solid particles when the wash pan in which dishes have been washed is emptied upon the sink. Further objects and advantages of my invention will appear as the specification proceeds.

The preferred form of my invention is illustrated in the accompanying drawing in which—

Figure 1:
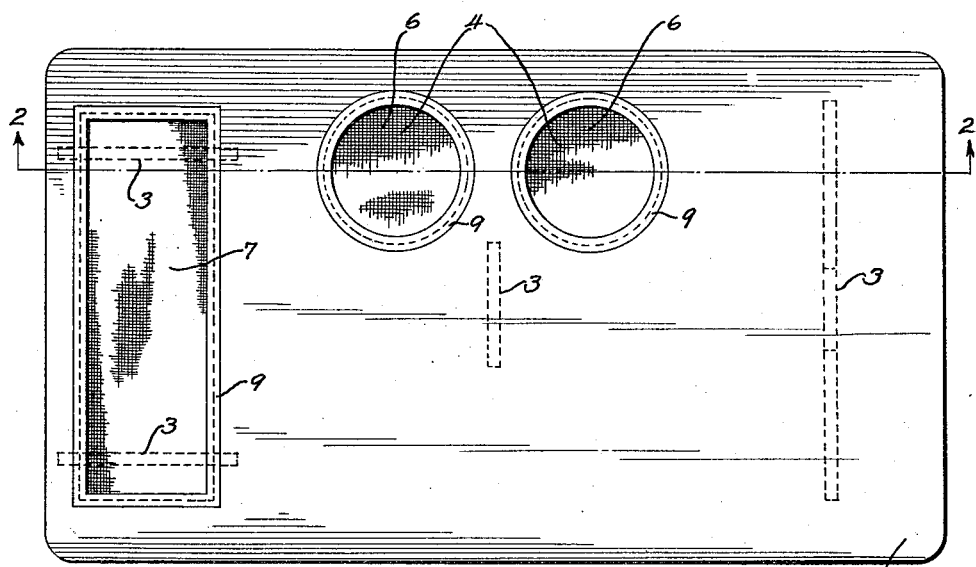
Figure 2:
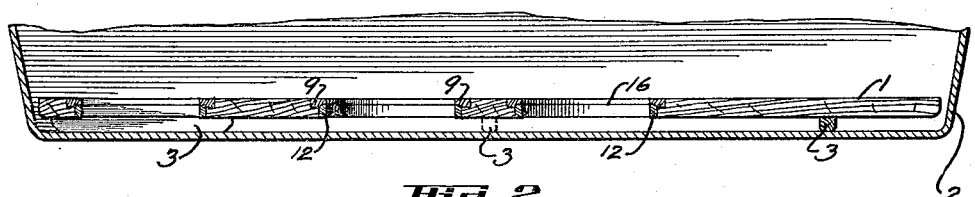
Figure 3:
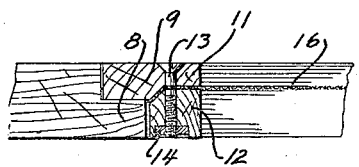

Figure 1 shows a plan view of my sink strainer,

Figure 2, a vertical section taken along line 2—2 of Figure 1, and showing the strainer in connection with the sink and Figure 3, an enlarged sectional detail view illustrating the means by which a strainer is removably fastened in the drain board.

While I have shown only the preferred form of the invention it should be understood that various changes or modifications may be made within the scope of the claims hereto attached, without departing from the spirit of the invention.

The drain board 1 is preferably made of such a size as to be substantially co-extensive with the bottom of the sink 2 and is provided with cleats 3 at the bottom face adapted to hold the board in spaced relation relative to the bottom of the sink. Thus, when the drain board is removed from the sink, there are no projections in the sink to interfere with the cleaning thereof, as would be the case, if the cleats 3 for supporting the drain board were attached to the sink. Along the rear edge of the board I provide two apertures 4 over which strainers 6 are placed, the apertures arranged in such a manner as to be directly below the two faucets normally provided in connection with a sink so that water discharged from the faucets strikes the strainers and is thereby prevented from splashing. Along the left side edge of the board I provide a second strainer 7 which latter is made rather elongated and is intended to serve the purpose of allowing a wash pan to be emptied thereon so that the solid matter that has assembled in the wash pan during the washing of the dishes is collected thereon and is prevented from reaching the sink drain.

My strainers are preferably secured to the board in such a manner as to be readily removable and one way of accomplishing this is illustrated in Figure 3 from which it appears that a ledge 8 is provided in the margin of the opening and has a frame 9 resting thereon which latter projects internally into the opening as shown at 11. A second frame 12 is adapted for introduction into the opening from the bottom and may be pressed against the projecting section of the first screen by means of screws 13 and nuts 14, the screen 16 being confined between the two frames. The two frames and the strainer may be assembled outside of the board and may be inserted thereafter. It may be readily removed as one unit by reversing the board and tapping one edge thereof against a support.

I claim:

1. A sink strainer of the character described comprising a board dimensioned to substantially fill the bottom of the sink, means for supporting the board in spaced relation to the bottom of the sink, the board being formed with a large opening and a ledge at the border thereof, a frame resting on the ledge and projecting interiorly thereof, a strainer, and a second frame adapted to be pressed against the projecting portion of the first frame and to clamp the strainer therebetween.

2. A drain board of the character described, comprising a board dimensioned to substantially fill the bottom of a sink, means for supporting the board in spaced relation to the bottom of the sink, there being a plurality of openings thru the board below existing faucets in the sink and a strainer mounted in each of said openings adapted to prevent splashing of water discharged from said faucets.

3. A device as claimed in claim 2, and in addition, there being a large opening in said board extending substantially thereacross, and a strainer removably mounted in said opening.

4. A drain board comprising in combination a board dimensioned to substantially fill the bottom of a sink, means for supporting the board in spaced relation to the bottom of the sink, the board being formed with a large opening having a ledge at the border thereof, a frame resting on the ledge and projecting interiorly thereof, a strainer and a second frame adapted to be pressed against the projecting portion of the first frame to clamp the strainer therebetween, there being openings extending thru said drain board below existing faucets and a strainer mounted in each of said openings.

In testimony whereof I affix my signature.

MARY CAPRA.